May 14, 1940.  T. C. MAHON  2,200,578
PRESSURE EQUALIZING VALVE
Filed Nov. 7, 1938
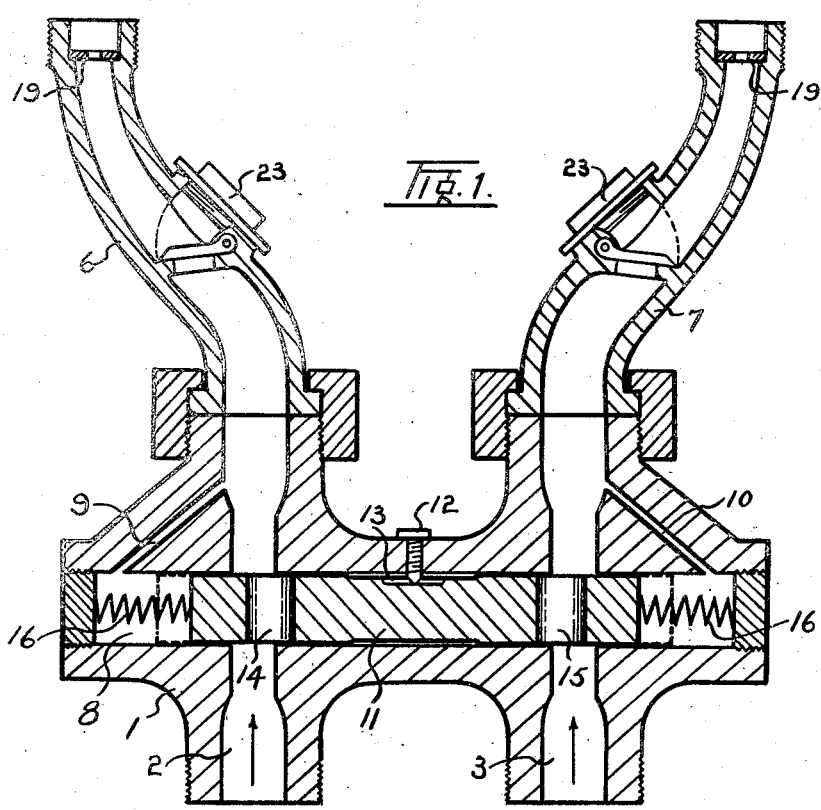
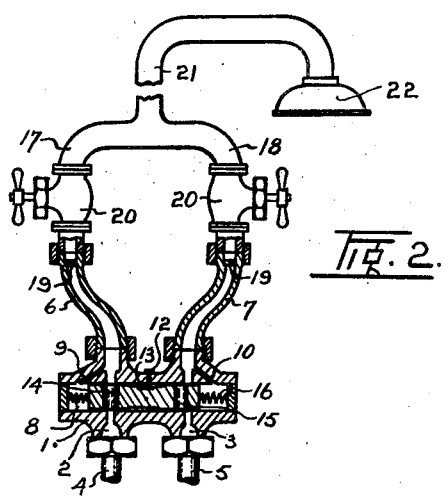
INVENTOR.
THOMAS C. MAHON.
ATTORNEY.

UNITED STATES PATENT OFFICE 2,200,578

PRESSURE EQUALIZING VALVE

Thomas C. Mahon, Burnaby, British Columbia, Canada

Application November 7, 1938, Serial No. 239,293
In Canada November 9, 1937

3 Claims. (Cl. 277—20)

My invention relates to improvements in pressure equalizing valves which are particularly adapted for inclusion in hot and cold water services. The object of the invention is to provide a non-thermostatic valve which will function automatically to maintain the flow of water from a hot and cold water delivery pipe such as over lavatory basins, shower fixtures and the like at a desired temperature even when a valve remote from the invention and on the supply side of one pipe is opened and the pressure of flow in that pipe is reduced thereby. An object of the invention is to maintain the temperature by using the pressure differential set up by opening a remotely placed valve to equalize itself to the proportionate opening of the hot and cold discharge valves or valve connected with the equalizing valve.

The invention consists of a valve having two through passages and a piston floating between and intersecting said passages, said piston having a port for each passage adapted to be in approximately half register with each of the passages and ported passages leading from the delivery side of each of said through passages to the adjacent end of the piston, as will be more fully described in the following specification and shown in the accompanying drawing, in which:

Fig. 1 is a sectional view of the invention.

Fig. 2 is a reduced scale view showing the general installation of the valve and the position the plunger would assume where a reduction in pressure on the supply side of the cold water pipe develops due to the opening of a remote valve thereon.

In the drawing like characters of reference indicate corresponding parts in each figure.

The numeral 1 indicates the valve body which is provided with two through passages 2 and 3, the outer ends of which are threaded in the usual way to provide connections at the base for connection to supply pipes 4 and 5. For the purpose of illustration the pipe 4 will be taken as representing the cold water supply and the pipe 5 representing the hot water supply.

The upper ends of the passages 2 and 3 are threaded for connection to the delivery pipes direct or to pressure chambers 6 and 7. Extending horizontally and intersecting the passages 2 and 3 is a cylindrical bore 8 which is closed off at both ends and is provided at one end with a bye-pass 9 and at the opposite end with a similar bye-pass 10 each communicating with the upper end of its adjacent through passage 2 and 3.

Floating in the cylindrical bore 8 is a piston 11 which is held against rotation by any suitable means, such as a set screw 12 entering a key slot 13 cut along the periphery of the piston. The piston is provided with ports 14 and 15 preferably of the same diameter as the through passages, but which are spaced apart so that when the piston is in its central position each port is approximately half in and half out of register with its through passage, and when the piston is moved to the extreme end of its stroke one port is in full register with its passage and the other port is in part register with its passage. In effect the spacing between the two ports and between the two through passages is slightly more than the cross dimension of one port. Light springs 16 may be used at opposite ends of the piston to urge it back to its central or normal position after use, and also to prevent the possibility of piston hammer incidental to quick pressure changes.

The pressure chambers 6 and 7 consist preferably of a short length of pipe offset for convenience only in installing to irregularly spaced delivery pipes, these chambers are preferably, though not essentially tapered towards their upper ends and are fitted at their connection to the delivery pipes 17 and 18 with constrictions 19 which are preferably in the form of apertured discs, their object being to normally maintain pressure in the pressure chambers at least equal to that which will prevail adjacent the control valves 20.

In the installation of a shower the delivery pipes 17 and 18 would be connected beyond the control valves 20 to a common pipe 21 to which would be fitted a shower head 22.

In installations where the supply to either of the supply pipes 4 and 5 is likely to be substantially cut off owing to the opening of a remote valve being opened, I may install a check valve 23 of any suitable type in one or both of the pressure chambers 6 and 7 as shown in Figure 1.

The functions of the invention are as follows:

Assuming the pressure of water in the supply pipes 4 and 5 to be equal and the control valves being set to give a flow of water at a given temperature between that of the hot and the cold water supply, a pressure will develop in the pressure chambers 6 and 7 which will also be equal and consequently the temperature at discharge will remain constant. If a valve communicating with say the cold water supply pipe 4 is opened a drop will occur in the pressure in the pipe 4 and a corresponding drop will also occur in the pressure chamber 6 while the pressure in the chamber 7 has remained unchanged. The excess pressure therefore in the chamber 7 over that of the chamber 6 is communicated through the bye-pass 10 to the end of the piston adjacent the passage 4, thus forcing the piston over to the left as shown in Figure 2 to reduce the flow of water through the piston port 15 and increase the registration between the port 14 and the through passage 3. When the flow through the port 15 into the pressure chamber 7 is reduced proportionately, according to the setting of the control valves to that flowing through the port 14, the pressures will again become balanced and the piston 11 remain stationary, consequently while the volume of water discharged from both passages 2 and 3 will be reduced, the temperature will remain substantially constant. As soon as the normal pressure is restored on the cold water supply pipe 4 the equalizer will again be momentarily thrown out of balance in the opposite direction, the pressure rising in the pressure chamber 6, thus forcing the piston to the right, partly shutting off the flow through the port 14 and moving the port 15 into more complete registration with the passage 3, thus again restoring the pressure in the pressure chamber 7 to the same as that in the chamber 6 and increasing the flow to discharge while maintaining the temperature at that for which it was set.

The check valves 23 appear to be desirable only in places where a remote valve on the supply pipe is of such proximity to the device, or is capable of being rapidly opened to full position as to momentarily bleed the supply and stop the flow of water to the device. In such an event, the pressure on the thus bled supply pipe becomes negative for a moment partly due to the closing of the adjacent check valve and thus aiding the piston in its movement to reduce the flow through the opposite through passage of the equalizer valve.

What I claim as my invention is:

1. A pressure equalizing valve comprising a body having two through passages having flow and discharge ends, a piston common to both intersecting each passage, said piston having a port for each passage which ports are so spaced that when the piston is in normal position the ports are in half register with each of said passages and when the piston is at an end of its stroke one port is in full register with its passage and the other port is in partial register with its passage, and a bye-pass communicating between the discharge ends of each through passage and the piston.

2. A pressure equalizing valve comprising a body having two through passages having flow and discharge ends, a piston common to both intersecting each passage, said piston having a port for each passage, which ports are so spaced that when the piston is in normal position the ports are in half register with each of said passages and when the piston is at an end of its stroke one port is in full register with its passage and the other port is in partial register with its passage, and a bye-pass communicating between the discharge ends of each through passage and the adjacent end of the piston.

3. A pressure equalizing valve comprising a body having two through passages spaced apart and of a given cross dimension, each passage having a flow and a discharge end, a piston common to both intersecting each passage, said piston having two spaced ports of the same cross dimension as the passages, the spacing between said ports differing from the spacing of the through passages by more than one half of the cross dimension of one port, and a bye-pass communicating between the discharge ends of each through passage and the piston.

THOMAS C. MAHON.